United States Patent
Reichelt et al.

(10) Patent No.: US 11,136,689 B2
(45) Date of Patent: Oct. 5, 2021

(54) METHOD FOR THE SURFACE FINISHING OF METALS AND ALLOYS

(71) Applicant: Airbus Defence and Space GmbH, Taufkirchen (DE)

(72) Inventors: Sarah Reichelt, Munich (DE); Tobias Mertens, Munich (DE); Banry Thibaud, Bourg-Saint-Christophe (FR)

(73) Assignee: Airbus Defence and Space GmbH

( * ) Notice: Subject to any disclaimer, the term of this patent is extended or adjusted under 35 U.S.C. 154(b) by 308 days.

(21) Appl. No.: 16/316,884

(22) PCT Filed: Jul. 13, 2017

(86) PCT No.: PCT/EP2017/067656
§ 371 (c)(1),
(2) Date: Jan. 10, 2019

(87) PCT Pub. No.: WO2018/011326
PCT Pub. Date: Jan. 18, 2018

(65) Prior Publication Data
US 2019/0292681 A1    Sep. 26, 2019

(30) Foreign Application Priority Data
Jul. 13, 2016 (EP) .................................... 16179270

(51) Int. Cl.
*C25F 3/18*  (2006.01)
*C25F 3/16*  (2006.01)

(52) U.S. Cl.
CPC . *C25F 3/18* (2013.01); *C25F 3/16* (2013.01)

(58) Field of Classification Search
CPC .............................................. C25F 3/16–3/28
See application file for complete search history.

(56) References Cited

U.S. PATENT DOCUMENTS

| | | | |
|---|---|---|---|
| 2009/0107851 A1 | 4/2009 | Kodera et al. | |
| 2012/0115759 A1 | 5/2012 | Reyes | |
| 2012/0125787 A1 | 5/2012 | Clasquin et al. | |
| 2016/0376724 A1* | 12/2016 | Bagehorn | ............... C22C 28/00 205/646 |

FOREIGN PATENT DOCUMENTS

| | | |
|---|---|---|
| JP | 2004143530 A | 5/2004 |
| WO | 2005/024099 A1 | 3/2005 |

OTHER PUBLICATIONS

International Search Report from PCT/EP2017/067656 dated Oct. 13, 2017.

* cited by examiner

*Primary Examiner* — Nicholas A Smith
(74) *Attorney, Agent, or Firm* — Lerner, David, Littenberg, Krumholz & Mentlik, LLP

(57) ABSTRACT

An electrolyte (EL) for the electrolytic polishing of a metallic substrate includes at least one fluoride compound (F) and/or one chloride compound (Cl), and at least one complexing agent (CA), wherein the electrolyte (EL) does not contain an acid compound that is not a complexing agent. Furthermore, a process for the electrolytic polishing of a metallic substrate wherein the electrolyte (EL) is applied is described.

7 Claims, 4 Drawing Sheets

METHOD FOR THE SURFACE FINISHING OF METALS AND ALLOYS

CROSS-REFERENCE TO RELATED APPLICATIONS

The present application is a national phase entry under 35 U.S.C. § 371 of International Application No. PCT/EP2017/067656 filed Jul. 13, 2017, which claims priority from European Patent Application No. 16179270.0 filed Jul. 13, 2016, all of which are incorporated herein by reference.

The present invention relates to an electrolyte for the electrolytic polishing of a metallic substrate as well as to a process for the electrolytic polishing of a metallic substrate using this electrolyte.

Additive layer manufacturing (AM) is a promising technology for the manufacturing of (near) net-shape build-us of metallic parts. On the basis of a previously sliced computer-aided design (CAD) model, AM parts can be built up layer by layer in incremental steps. Within each layer, the raw material—either from a powder or a wire based feedstock—is selectively molten by an energy source (e.g. laser beam). This setup provides a variety of design possibilities, which—together with the use of light-weight materials—is of current interest for several applications within e.g. the aerospace industry. In comparison to "conventional" production methods, AM enables the manufacturing of structurally and topologically optimized components, contributing significantly to the acceleration of development time, the reduction of waste and the lowering of cost. However, there is still room for improvement in AM technology with regard to achieving homogeneous surfaces with decreased surface roughness.

The shaping and surface finishing, especially of metallic substrates, has often proven a challenge. In particular the shaping and surface finishing of metallic substrates obtained from generative processes such as additive layer manufacturing often exhibit rough surfaces.

In order to improve the mechanical characteristics, as well as the surface morphology, and to prepare the surface for subsequent treatment like bonding or paint application, methods exist to further smoothen the surface. A special interest therein is in the smoothening of complex geometries.

Different techniques can be considered for the smoothening of, e.g. AM built, surfaces, but ideally the following should be achieved:
- the possibility of treating complex parts and inner structures such as holes and tubes
- compliance with regulations, e.g. REACh regarding chemicals used
- short treatment times, preferably below 30 minutes.

Commercially available surface finishing processes can be categorized according to mechanical, (electro-)chemical and laser treatments.

Mechanical Processes

In such processes, the sample is smoothened due to a relative movement of a rough, abrasive medium (e.g. aluminium oxide) and the sample surface. The abrasives can either be blasted onto the sample with high pressure (e.g. Blasting, Abrasive Jet Machining) or be first fluidized in an emulsion (e.g. Fluidized Bed Machining). Another alternative is a gathering of the abrasive medium and the sample(s) to be treated inside a vibrating bowl (Vibratory Finishing). If applicable, AM parts can also be milled in order to achieve a homogeneous surface morphology with a low surface roughness. While the achievable surface roughness usually depends on the initial surface roughness, generally Blasting achieves a surface roughness $R_a$ of about 3-10 µm in less than 10 minutes treatment, while Milling takes about 30 minutes to achieve <1 µm, Abrasive Jet Milling <10 minutes for <1 µm, Fluidized Bed Machining about 60 to 2000 minutes for <1 µm, and Vibratory Finishing about 30 to 2000 minutes for $R_a$<1 µm.

Mechanical processes are usually quite difficult to implement on complex shapes or inner structures, though. For the treatment of inner structures, e.g. Abrasive Flow Machining achieves $R_a$<3 µm in about 0.5-60 minutes, Ball Burnishing <1 µm in about 1-4 minutes, and Magnetic Abrasive Finishing <1 µm in about 1 to 5 minutes. During the Abrasive Flow Machining, a medium with a high viscosity containing abrasive compounds is pressed through a clamped workpiece by to hydraulic pistons. The movement of the abrasive compounds can reduce the inner roughness peaks. Using the Ball Burnishing process, a ball made of a smooth, resistant material (e.g. carbon chromium) is placed inside a rotating, respectively a moving tool, which fits inside a cylindrical sample. The movement of the tool placed at the inner surface of the sample causes plastic deformation of asperities and finally a sample smoothening. The Magnetic Abrasive Finishing technology uses magnetic abrasive particles, which are inserted in a tube while insisting a magnetic field. This conglomerates the particles around the area to be smoothened. A rotation of the magnetic poles around the sample causes the movement of the magnetic particles and therefore a polishing of the inner structure to be treated. However, it is difficult to implement such processes on outer surfaces.

Laser Treatment

A pulsating laser beam can be sent to the metallic surface including a temperature field, and therefore melting a thin layer on the material surface. The molten material is generally free flowing and is relocated on the sample due to surface tension. The surface is smoothened by the remelting of the surface asperities. Within 5-2000 minutes treatment time a surface roughness of <1 µm is achievable. Inner structures are difficult to treat, though, and melting may cause a change in material properties.

Chemical Processes

In chemical processes, the sample to be treated is generally immersed entirely in an aggressive acidic or alkaline bath. Due to a chemical etching reaction, a homogeneous material removal at the surface peaks and valleys usually takes place. Electrolytes that are used are usually made of strong acids (e.g. sulfuric, phosphoric and/or nitric acid) or alkaline solutions (e.g. sodium hydroxide, sodium cyanide, sodium sulfide). For example, a surface roughness of <1 µm can be achieved in 1-2000 minutes using chemical milling. The process is usually easy to handle and cost efficient and can possibly also treat complex and/or inner structures. Due to the applied chemicals which can be aggressive and/r hot, safety and health requirements can be high, though, e.g. regarding safety measures and the recycling of used electrolyte.

Electrochemical Processes

The part to be treated is usually immersed into an electrolyte bath and connected to the anodic pole of a direct current power supply and therefore serves as the anode. The cathode is connected to its corresponding pole and is also placed inside the bath. When the current starts to run, the sample is smoothened by selective electrochemical attacks on the peaks of the sample due to a higher current density in these areas. In the particular case of plasma electrolyte polishing, an ionized plasma layer is formed around the sample, which is responsible for the surface smoothening.

A lot of different possible electrolyte compositions exist. For example, usually concentrated acids (chromic, sulfuric, perchloric and/or phosphoric acid) and/or salts (potassium chloride, sodium nitrate) are mixed with either water or alcohol, e.g. in electrolytic polishing of aluminium alloys. With electrochemical polishing, usually roughness of about 0.1 to 3 µm can be achieved in about 2 to 15 minutes time.

Electrochemical polishing can treat complex structures with high roughness values and achieve a good final surface roughness in reasonable time. However, for acids, etc., still safety concerns exist, as well as possibly also ecological concerns (e.g. recycling of spent electrolyte). Plasma electrolyte polishing, which can use non-polluting electrolytes made of aqueous solutions of salts, is difficult for treating inner structures.

In electrochemical polishing processes, it is often required to apply hazardous chemicals which require a cumbersome disposal. Thus, it is an object of the present invention to provide an enhanced electrolytic polishing process for a fast roughness reduction, particularly on AM built metallic surfaces.

The finding of the present invention is an electrolyte for the application in an electrolytic polishing process for metallic substrates, resulting in an excellent reduction of surface roughness. The present electrolyte therein is free of strong acids, which makes the polishing process less cumbersome with regard to handling and safety and has less impact on the environment.

In a first aspect, the present invention relates to an electrolyte (for the electrolytic polishing of a metallic substrate comprising at least one fluoride compound and/or one chloride compound, and at least one complexing agent, characterized in that it does not contain an acid compound that is not a complexing agent.

The invention further relates to a process for the electrolytic polishing of a metallic substrate comprising the steps of providing an electrolyte according to the first aspect in an electrolytic cell comprising at least one electrode, disposing a metallic substrate as an anode in the electrolytic cell, applying a current from a power source between the at least one electrode and the metallic substrate, and immersing the metallic substrate in the electrolyte.

Further aspects and embodiments of the invention are disclosed in the dependent claims and can be taken from the following description, figures and examples, without being limited thereto. It is to be understood that the different aspects of the invention and the embodiments described above and below are interrelated such that the disclosures supplement each other. For example, the electrolyte described according to the first aspect is preferably applied in the process according to the second aspect.

FIGURES

The enclosed drawings should illustrate embodiments of the present invention and convey a further understanding thereof. In connection with the description they serve as explanation of concepts and principles of the invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

Figure 1:
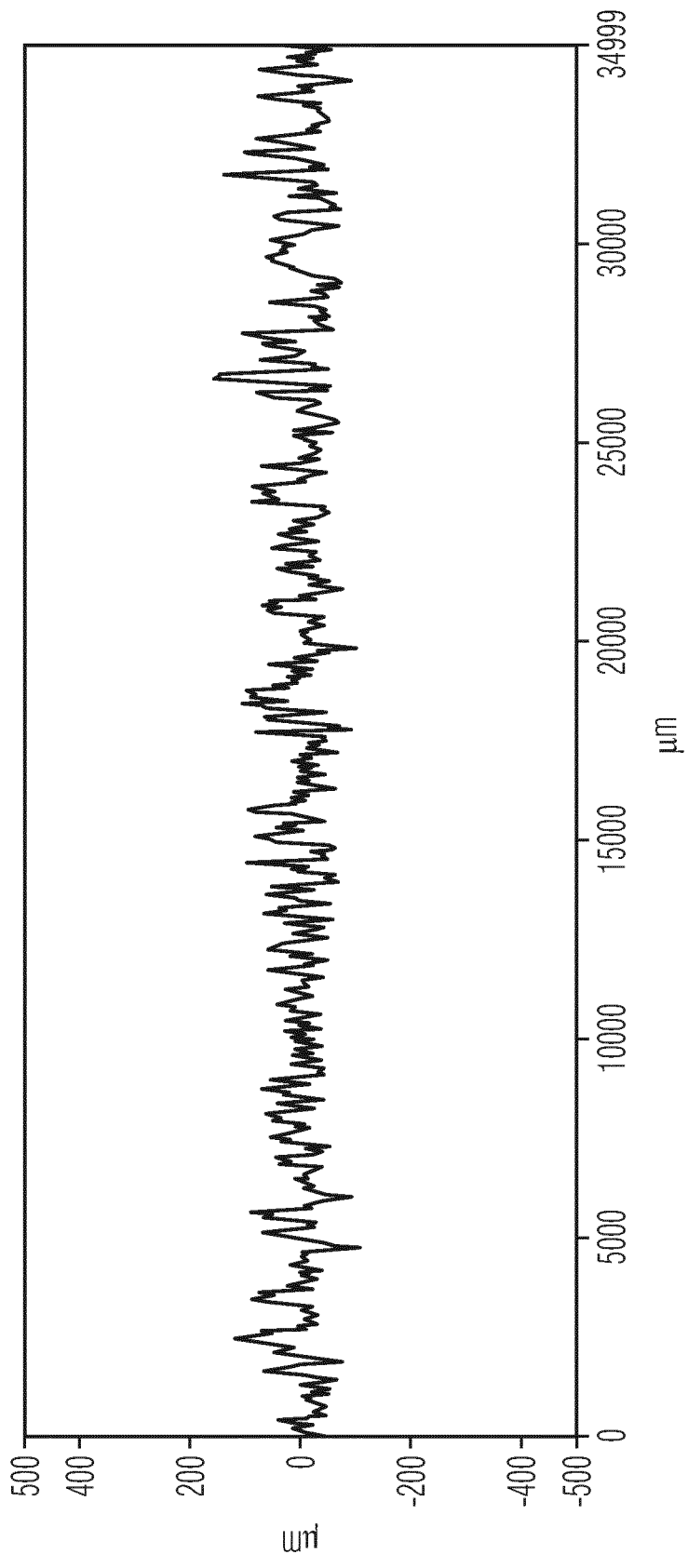
FIG. 1 shows a roughness profile of an as built AM AlSi10Mg (LBM, PB (based on a powder bed based additive process)) sample in Example 3.

In the following the invention is described in more detail:

The invention is directed at an electrolyte (EL) for the electrolytic polishing of a metallic substrate that is less hazardous then comparable existing solutions with excellent long-term stability and efficiency of surface roughness reduction when applied in an according process. The invention is further directed to an enhanced electrolytic polishing process, particularly for the roughness reduction of AM built metallic components. The process can also be used for the treatment of complex structures.

The Electrolyte (EL)

The invention is directed at an electrolyte (EL). The term "electrolyte" as used according to the present invention is directed at a fluid that can be applied in an electrolytic cell as conducting medium in which the flow of current is accompanied by the movement of matter in the form of ions.

The electrolyte (EL) for the electrolytic polishing of a metallic substrate comprises at least one fluoride compound (F) and/or one chloride compound (Cl), and at least one complexing agent (CA), but does not contain an acid compound that is not a complexing agent. It can further comprise at least one medium (M) and additives (AD). According to certain embodiments, the electrolyte (EL) comprises at least one fluoride compound (F) and no chloride compound (Cl). According to certain embodiments, the electrolyte (EL) comprises at least one chloride compound (Cl) and no fluoride compound (F). According to certain embodiments, the electrolyte (EL) comprises at least one fluoride compound (F) and at least one chloride compound (Cl). According to certain embodiments, it comprises a medium (M). According to certain embodiments, it comprises one or more additives (AD). The additives (AD), medium (M), at least one fluoride compound (F) and/or one chloride compound (Cl) are not acids, though.

In a preferred embodiment the electrolyte (EL) does not comprise any other fluoride compounds and/or chloride compounds and complexing agents beside the at least one fluoride compound (F) and/or the at least one chloride compound (Cl), and the at least one complexing agent (CA).

In a preferred embodiment the electrolyte (EL) consists of at least one fluoride compound (F) and/or one chloride compound (Cl), at least one complexing agent (CA), at least one medium (M), and optionally additives (AD), wherein it does not contain an acid compound that is not a complexing agent.

The present electrolyte does not contain an acid compound that is not a complexing agent, particularly not an acid compound selected from the group consisting of inorganic or organic acids such as sulfuric acid, nitric acid, phosphoric acid, hydrochloric acid, formic acid, acetic acid propionic acid, or mixtures thereof, hat is not a complexing agent.

The Fluoride Compound (F) and/or Chloride Compound (Cl)

The term "fluoride compound" as used according to the present invention is directed at a compound that can serve as a source of fluoride ions. Similarly, the term "chloride compound" as used according to the present invention is directed at a compound that can serve as a source of chloride ions. Depending on the metallic substrate to be treated in an electrolytic polishing process fluoride and/or chloride ions may be required to support the dissolution process, for example by forming stable complexes with dissolved metal ions.

Preferably the at least one fluoride compound (F) and/or chloride compound (Cl) is comprised in the electrolyte (EL) in an amount of not more than 40 wt.-%, preferably in an amount of not more than 30 wt.-%, more preferably in an amount of not more than 25 wt.-%, even more preferably in an amount of not more than 20 wt.-%, like an amount in the range of in the range of 1 to 40 wt.-%, preferably in the range of 2 to 30 wt.-%, more preferably in the range of 3 to 30 wt.-%, even more preferably in the range of 5 to 25 wt.-%, e.g. 10 wt.-%, based on the weight of the electrolyte (EL).

It is appreciated that the at least one fluoride compound (F) is, according to certain embodiments, selected from the group consisting of ammonium fluoride, sodium fluoride, potassium fluoride, magnesium fluoride, calcium fluoride, or mixtures thereof, preferably is selected from the group consisting of ammonium fluoride, sodium fluoride, potassium fluoride, magnesium fluoride, calcium fluoride, or mixtures thereof, more preferably is ammonium fluoride.

It is appreciated that the at least one chloride compound (Cl) is, according to certain embodiments, selected from the group consisting of ammonium chloride, sodium chloride, potassium chloride, magnesium chloride, calcium chloride, or mixtures thereof, preferably is selected from the group consisting of ammonium chloride, sodium chloride, potassium chloride, magnesium chloride, calcium chloride, or mixtures thereof, more preferably is ammonium chloride.

It is believed that the application of ammonium fluoride and/or ammonium chloride additionally benefits the process of electrolytic polishing of metallic substrates by providing a cationic wetting agent ($NH_4^+$) which modifies the polarization of the electrodes.

The Complexing Agent (CA)

The term "complexing agent" as used according to the present invention is directed at compounds that form coordinate bonds with a metal atom or ion. Chelating agents are complexing agents that form a particular type of complex, that involves the formation or presence of two or more separate coordinate bonds between a polydentate (multiple bonded) ligand and a multivalent single central atom. Usually these ligands are organic compounds, and are called chelants, chelators, chelating agents, or sequestering agents. The term "complexing agent" includes both non-chelating complexing agents and chelating complexing agents, the latter being preferred.

The at least one complexing agent (CA) is an essential constituent of the electrolyte (EL). The at least one complexing agent (CA) benefits the long-term stability of the electrolyte (EL) and increases the efficiency of surface roughness reduction achieved by electrolytic polishing of a metallic substrate.

Preferably the at least one complexing agent (CA) is comprised in the electrolyte (EL) in an amount of not more than 30 wt.-%, preferably in an amount of not more than 20 wt.-%, more preferably in an amount of not more than 15 wt.-%, even more preferably in an amount of not more than 12 wt.-%, like an amount in the range of in the range of 0.1 to 30 wt.-%, preferably in the range of 0.1 to 20 wt.-%, more preferably in the range of 0.1 to 12 wt.-%, even more preferably in the range of 0.5 to 10 wt.-%, yet even more preferably in the range of 0.5 to 5 wt. %, e.g. 1 wt.-%, based on the weight of the electrolyte (EL).

It is appreciated that the at least one complexing agent (CA) is, according to certain embodiments, selected from the group consisting of metylglycindiacetic acid (MGDA), ethylenediaminetetraacetate (EDTA), diethylenetriamine-pentakismethylenephosphonic acid (DTPMP), aminopolycarboxilic acids (APC), diethylenetriaminepentaacetate (DTPA), nitrilotriacetate (NTA), triphosphate, 1,4,7,10 tetraazacyclododecane-1,4,7,10-tetraacetic acid (DOTA), phosphonate, diethylenetriamine-pentakismethylene-phosphonic acid (DTPMP), gluconic acid, β-alaninediactetic acid (ADA), N-bis[2-(1,2 dicarboxy-ethoxy)ethyl]glycine (BCA5), N-bis[2-(1,2-dicarboxyethoxy)ethyl]-aspatic acid (BCA6), tetracis(2-hydroxypropyl)ethylenediamine (THPED), N-(hydroxyethyl)-ethylenediaminetriacetic acid (HEDTA) or mixtures thereof, preferably is selected from the group consisting of metylglycindiacetic acid (MGDA), ethylenediaminetetraacetate (EDTA), diethylenetriamine-pentakismethylenephosphonic acid (DTPMP), aminopolycarboxilic acids (APC), diethylenetriaminepentaacetate (DTPA), diethylenetriaminepentakismethylene-phosphonoc acid (DTPMP), tetracis(2-hydroxypropyl)ethylenediamine (THPED), N-(hydroxyethyl)-ethylenediaminetriacetic acid (HEDTA), or mixtures thereof, more preferably is metylglycindiacetic acid (MGDA).

The Medium (M)

The electrolyte (EL) may comprise at least one medium (M). The term "medium" as used according to the present invention is directed at any organic or inorganic compound suitable for providing a medium wherein the electrolytic polishing of metallic substrates can be conducted. Preferably the at least one medium (M) benefits the process of electrolytic polishing of metallic substrates, for example by increasing the conductivity of the electrolytic cell, by stabilizing the complexes formed by the at least one complexing agent (CA) and/or by providing a sufficient solubility with respect to the compounds comprised in the electrolyte (EL).

Preferably the at least one medium (M) is comprised in the electrolyte (EL) in an amount of at least 10 wt.-%, preferably in an amount of at least 30 wt.-%, more preferably in an amount of at least 50 wt.-%, even more preferably in an amount of at least 70 wt.-%, like an amount in the range of 10 to 98.5 wt.-%, preferably in the range of 30 to 95 wt.-%, more preferably in the range of 50 to 90 wt.-%, even more preferably in the range of 70 to 89 wt.-%, based on the weight of the electrolyte (EL).

It is appreciated that, according to certain embodiments, the at least one medium (M) is selected from the group consisting of water, alcohols, ethers, esters, and mixtures thereof, like $C_1$ to $C_8$ aliphatic alcohols, $C_1$ to $C_8$ aliphatic ethers, $C_1$ to $C_8$ aliphatic esters, and mixtures thereof, preferably from the group consisting of water, alcohols, ethers, and mixtures thereof, like $C_1$ to $C_8$ aliphatic alcohols, $C_1$ to $C_8$ aliphatic ethers, and mixtures thereof. In a preferred embodiment the at least one medium (M) is water.

In a preferred embodiment the term "water" is directed at deionized water.

In an embodiment the at least one medium (M) is itself an electrolyte which is compounded with the at least one fluoride compound (F) and/or at least one chloride compound (Cl), the at least one complexing agent (CA) and optionally additives (AD) to form the electrolyte (EL). In a preferred embodiment the at least one medium (M) is water which is compounded with the at least one fluoride compound (F) and/or at least one chloride compound (Cl), the at least one complexing agent (CA) and optionally additives (AD) to form the electrolyte (EL). In other words in a preferred embodiment the electrolyte (EL) is an aqueous electrolyte comprising the at least one fluoride compound (F) and/or at least one chloride compound (Cl) and the at least one complexing agent (CA).

The Additives (AD)

The electrolyte (EL) may comprise additional additives (AD) that are applied in the electrolytic polishing of metallic substrates to benefit the process. Typical additives are known to a person skilled in the art of electrolytic polishing of metallic substrates and are applied according to needs. Typical additives for the electrolytic polishing of metallic substrates are for example surfactants, polyvalent alcohols, silicates, thickeners, and the like.

It is appreciated that the additives (AD) are, according to certain embodiments, present in the electrolyte (EL) in an amount of not more than 25 wt.-%, preferably in an amount of not more than 15 wt.-%, more preferably in an amount of not more than 10 wt.-%, even more preferably in an amount of not more than 5 wt.-%, yet even more preferably in an amount of not more than 2 wt.-%, like an amount in the range of 0.01 to 25 wt.-%, preferably in the range of 0.01 to 10 wt.-%, more preferably in the range of 0.01 to 5 wt.-%, even more preferably in the range of 0.01 to 2 wt.-%, based on the weight of the electrolyte (EL).

The Process for the Electrolytic Polishing of a Metallic Substrate

The invention is further directed at a process for the electrolytic polishing of a metallic substrate.

A process for the electrolytic polishing of a metallic substrate is described comprising the steps of
(i) providing an electrolyte (EL) as described herein in an electrolytic cell comprising at least one electrode,
(ii) disposing a metallic substrate as an anode in the electrolytic cell,
(iii) applying a current from a power source between the at least one electrode and the metallic substrate, and
(iv) immersing the metallic substrate in the electrolyte (EL).

The term "electrolytic cell" as used according to the present invention is directed at an electrochemical cell that undergoes a redox reaction when electrical energy is applied. In particular an electrochemical cell containing an electrolyte through which an externally generated electric current is passed by a system of electrodes in order to produce an electrochemical reaction. The electrolytic cell can be used to decompose a metallic substrate, in a process called electrolysis.

In accordance with the present invention the electrolyte (EL) is provided in an electrolytic cell which also contains a suitable cathode. In a preferred embodiment the electrolytic cell comprises a container receiving the electrolyte wherein the container is made the cathode of the electrolytic cell. However, it is also possible that at least one separate electrode is present in the electrolytic cell which is made the cathode of the electrolytic cell. Furthermore, it is also possible that the electrolytic cell comprises a container receiving the electrolyte and at least one separate electrode, wherein both container and the at least one separate electrode are made the cathode of the electrolytic cell. The cathode material is not critical and suitable materials include copper, nickel, mild steel, stainless steel, graphite, carbon and the like.

In a preferred embodiment the surface of the cathode and the surface of the anode have a surface ratio of at least 10:1, preferably a surface ratio of at least 12:1, even more preferably a surface ratio of at least 15:1, like a surface ratio in the range of 10:1 to 100:1, preferably a surface ratio in the range of 12:1 to 100:1, more preferably a surface ratio in the range of 12:1 to 50:1, even more preferably a surface ratio in the range of 12:1 to 20:1.

In a preferred embodiment the current from a power source is applied between the at least one electrode and the metallic substrate, i.e. between the cathode and the anode of the electrolytic cell before the metallic substrate is immersed in the electrolyte (EL). In other words in a preferred embodiment process step (iii) is conducted before process step (iv). However, it is also possible that the current from a power source is applied between the at least one electrode and the metallic substrate, i.e. between the cathode and the anode of the electrolytic cell after the metallic substrate has been immersed in the electrolyte (EL). In other words in a further embodiment process step (iii) is conducted after process step (iv).

The composition of the electrolyte (EL) is critical. It is to be understood that the information provided above and below with respect to the electrolyte (EL) mutually applies to the inventive process for the electrolytic polishing of a metallic substrate in presence of the electrolyte (EL). Thus, the electrolyte (EL) for the electrolytic polishing of a metallic substrate comprises at least one fluoride compound (F) and/or at least one chloride compound (Cl), and at least one complexing agent (CA). In a preferred embodiment the electrolyte (EL) for the electrolytic polishing of a metallic substrate consists of at least one fluoride compound (F) and/or at least one chloride compound (Cl), at least one complexing agent (CA), at least one medium (M), and optionally additives (AD).

It is to be understood that the information provided above and below with respect to the at least one fluoride compound (F) and/or at least one chloride compound (Cl), the at least one complexing agent (CA), the at least one medium (M) and optionally additives (AD) mutually applies to the inventive process for the electrolytic polishing of a metallic substrate in presence of at least one fluoride compound (F) and/or at least one chloride compound (Cl), at least one complexing agent (CA), at least one medium (M) and/or optionally additives (AD).

It is an advantage of the present invention that the process for the electrolytic polishing of a metallic substrate can inter alia be applied to metallic substrates with complex surfaces. Thus, the metallic substrate may be in any form such as, for example, bars, plates, flat sheets, sheets of expanded metal, cuboids, or complex structures.

The term "metallic substrate" as used herein is meant to encompass substrates comprising at least one conductive metal or metal alloy. Preferably the metallic substrate consists of at least one conductive metal or metal alloy. It is appreciated that the metallic substrate comprises, preferably consists of, metals selected from the group consisting of aluminium, titanium, vanadium, chromium, manganese, iron, cobalt, nickel, copper, niobium, molybdenum, silver, hafnium, tungsten, platinum, gold, steel and combinations thereof, such as alloys, preferably selected from the group consisting of aluminium, titanium, vanadium, chromium, manganese, iron, cobalt, nickel, copper, niobium, molybdenum, steel and combinations thereof, such as alloys, more preferably selected from the group consisting of aluminium, titanium and vanadium, and combinations thereof, such as alloys. In a preferred embodiment the metal substrate is selected from the group consisting of titanium aluminides, Ti-6Al-4V, AlSi$_{10}$Mg, AlSi$_7$, Inconel 718, AMgSc, and combinations thereof. For alloys comprising titanium, preferably no chloride compound (Cl) is used according to certain embodiments. For different metallic substrates, e.g. different alloys, different electrolytes can be applied.

It has been found that the process results in an excellent reduction of surface roughness both at high voltages and at low voltages, particularly at high voltages. It has been surprisingly found that even at voltages above 100 V no uncontrolled gas development or pitting occur with the present electrolyte (EL), as the present electrolyte is less aggressive due to the absence of acids—apart from the complexing agent(s).

It is appreciated that—according to certain embodiments—the current is applied at a voltage of at least 25 V, preferably of at least 100 V, more preferably of at least 110 V, even more preferably of at least 120 V, like in the range of 10 to 500 V, preferably in the range of 25 to 500 V, more preferably in the range of 100 to 300 V, even more preferably in the range of 100 to 250 V, yet even more preferably in the range of 120 to 250 V.

Furthermore, it is appreciated that the current is applied at a current density in the range of 0.05 to 10 A/cm$^2$, preferably at a current density in the range of 0.05 to 5 A/cm$^2$, more preferably at a current density in the range of 0.1 to 2.5 A/cm$^2$, even more preferably at a current density in the range of 0.1 to 2.0 A/cm$^2$, yet even more preferably at a current density in the range of 0.1 to 1.5 A/cm$^2$, most preferably below 1.0 A/cm2.

The temperature does not appear to be a critical parameter. However, an increased temperature seems to improve the efficiency of the process for the electrolytic polishing of a metallic substrate. It is appreciated that the temperature of the electrolyte is at least 10° C., preferably is at least 40° C., more preferably is at least 60° C., even more preferably is at least 70° C., yet even more preferably is at least 75° C., like a temperature in the range of 20 to 95° C., preferably a temperature in the range of 40 to 95° C., more preferably a temperature in the range of 60 to 95° C., even more preferably a temperature in the range of 70 to 95° C., yet even more preferably a temperature in the range of 70 to 90° C.

The treatment time is generally within the range of 1 to 240 min. However, the treatment of some metallic substrates may require a shorter or longer treatment for the desired reduction in surface roughness, depending on factors such as initial surface roughness and desired surface roughness, surface area, surface geometry and the like. In a preferred embodiment the current is applied for a time in the range of 1 to 240 min, preferably for a time in the range of 1 to 120 min, more preferably for a time in the range of 1 to 60 min, even preferably for a time in the range of 2 to 30 min, yet even more preferably for a time in the range of 4 to 20 min, e.g for a time in the range of 5 to 15 min.

In a preferred embodiment the electrolyte is continuously agitated during the process for the electrolytic polishing of a metallic substrate. There are various methods of agitating an electrolyte during electrolytic polishing of a metallic substrate. The agitation may be achieved by immersing a pressurized gas. Suitable gases for immersion are for example, nitrogen, hydrogen helium, argon, and combinations thereof. During immersion the pressurized gas is bubbled through the electrolyte. The pressurized gas may have a pressure in the range of 0.01 to 1000 kg/cm$^2$, preferably a pressure in the range of 1 to 1000 kg/cm$^2$.

It may be beneficial for the process for the electrolytic polishing of a metallic substrate if the metallic substrate is subjected to pre- or post-treatment steps, such as treating the metallic substrate with a cleaning composition. In an embodiment the process for the electrolytic polishing of a metallic substrate comprises a post-treatment step of treating the metallic substrate with a cleaning composition, preferably a post-treatment step of treating the metallic substrate with water, preferably deionized water.

According to certain embodiments, the part to be treated is immersed in an electrolyte bath consisting of an aqueous solution of chemical salts. According to certain embodiments, the workpiece is connected as anodic pole to a direct current power supply. The cathode, whose surface area is preferably at least 12 times larger than the anodic surface, can also be immersed into the electrolyte bath. Alternatively, the cathodic current can also be supplied directly via the electrolyte bath walls. The cathode can, according to certain embodiments, consist of stainless steel. The workpiece is, according to certain embodiments, immersed into the bath at constant velocity and with induced voltage. In order to achieve a homogeneous surface roughness removal, the electrolyte is preferably continuously stirred during the process, e.g. via air injection.

The process for the electrolytic polishing of a metallic substrate provides metallic substrate with reduced surface roughness.

It is appreciated that the average surface roughness ($R_a$) of a metallic substrate treated according to the process for the electrolytic polishing of a metallic substrate described is reduced by at least 0.1 µm, preferably is reduced by at least 0.5 µm, even more preferably is reduced by at least 1.0 µm, like in the range of 0.1 to 100 µm, preferably in the range of 0.5 to 10 µm, even more preferably in the range of 1.0 to 5.0 µm.

Furthermore, it is appreciated that from the process for the electrolytic polishing of a metallic substrate described a metallic substrate is obtained with an average surface roughness ($R_a$) of not more than 10 µm, preferably of not more than 5 µm, more preferably of not more than 1 µm, even more preferably of not more than 0.5 µm, yet even more preferably of not more than 0.1 µm, like an average surface roughness ($R_a$) in the range of 10 to 0.01 µm, preferably an average surface roughness ($R_a$) in the range of 5 to 0.01 µm, more preferably an average surface roughness ($R_a$) in the range of 1 to 0.01 µm, even more preferably an average surface roughness ($R_a$) in the range of 0.5 to 0.01 µm, yet even more preferably an average surface roughness ($R_a$) in the range of 0.1 to 0.01 µm.

The electrolyte (EL) is described in more detail above and below in particular in the section "THE ELECTROLYTE".

The above embodiments and teachings may be reasonably combined with each other. Further embodiments and implementations of the invention also comprise not explicitly described combinations of features of the invention given before or in the following with regard to examples of the invention. Particularly, the skilled person will also add single aspects as improvements or add-ons to the respective basic embodiments of the invention.

EXAMPLES

Definitions and Measuring Methods

The average surface roughness ($R_a$) as well as other roughness parameters ($R_z$ (mean roughness depth) and $R_t$ (difference between the maximum and minimum value of the entire profile)) are determined according to DIN EN 4287 by means of a Bruker Dektak XT profilometer.

Examples 1 and 2: Exemplary Suitable Parameters

For a treatment of an AM built part made of AlSi10Mg, an electrolyte solution consisting of ammonium fluoride with a concentration of 5-20 wt.-%, preferably about 10 wt.-%, methylglycinediacetic acid (MGDA; complex builder) with a concentration of 0.1-10 wt.-%, preferably about 1 wt.-%, wherein the rest consists of purified water, adding the electrolyte solution up to 100 wt.-%, can be used.

For the surface smoothening of AM built AMgSc, an electrolyte solution consisting of ammonium fluoride with a concentration of 6-25 wt.-%, preferably about 10 wt.-%, methylglycinediacetic acid (MGDA; complex builder) with a concentration of 0.1-12 wt.-%, preferably about 1 wt.-%, wherein the rest consists of purified water, adding the electrolyte solution up to 100 wt.-%, can be used.

For both electrolytes, the chemicals are mixed in purified water for production thereof, adding up to 100 wt.-%.

MGDA is a strong complex builder having excellent ecological and toxicological characteristics. It can ensure a homogeneous surface roughness reduction even on a further microscale, which induces a shiny surface in the end. By complexing other reactants within the electrolyte bath, it also contributes—like other complexing agents—positively to the bath lifetime. For both electrolytes, a surface roughness of approximately $R_a<1$ μm can be achieved on the corresponding alloy made by a laser beam melting process. For both alloys, the samples show a homogeneously smooth and silver matt to shiny surface after the treatment.

For the treatment of parts made of AlSi10Mg, the following process parameters can e.g. be used:
1) Voltage between 25-500 V, preferably about 150 V
2) Electrolyte bath temperature between 20-95° C., preferably about 80° C.
3) Treatment time between 2-60 minutes, preferably about 10 minutes
4) Current density between 0.1-5 A/cm$^2$, preferably below 1 A/Cm$^2$ For the treatment of parts made of AlMgSc, the following process parameters can e.g. be used:
1) Voltage between 10-500 V, preferably about 200 V
2) Electrolyte bath temperature between 20-95° C., preferably about 75° C.
3) Treatment time between 2-60 minutes, preferably about 10 minutes
4) Current density between 0.1-5 A/cm$^2$, preferably below 1 A/Cm$^2$ In both cases, a stirring device can be used, which can for example be a magnetic or a mechanical device. With this enhanced electrolytic polishing process, the requirements for the treatment of AM parts are met since complex shaped structures can be processed and the treatment time is short in comparison to conventional surface finishing processes. Furthermore, all chemicals applied are REACh compliant.

Example 3: Treatment of Additively Manufactured AlSi10Mg

Initial "as built" surfaces of laser beam melting or electron beam melting AM built parts show a high surface roughness with an $R_a$ value of often more than 15 μm. This can be e.g. referred to the manufacturing process, during which single powder particles are partially molten onto the outer surface contour of the component to be built. This can be observed for an AM built AlSi10Mg as built surface (LBM) by optical microscopy at different magnifications, e.g. using an optical microscope like Keyence VHX 1000, wherein partially molten particles with different sizes and shapes can be observed (pictures not shown). This leads to an inhomogeneous, uneven and rough surface structure. The high initial roughness can significantly decrease the fatigue performance of AM built components, which is a limitation, e.g. for applications in cyclic loaded areas. By means of the present enhanced electrolytic polishing process, this roughness can be decreased significantly in order to increase the fatigue tolerances.

In order to obtain a smooth surface, the above AlSi10Mg sample was treated within a treatment time of 5-15 min at a voltage of 100-200 V and a current density between 0.1-5 A/cm$^2$, preferably below 1 A/Cm$^2$, immersed in an electrolyte bath as previously stated for AlSi10Mg in Examples 1 and 2. The bath temperature was heated up to 70-90° C. Table 1 shows the averaged measured roughness values of the as built as well as the treated sample, with the roughness parameters determined as defined above.

TABLE 1

Comparison of the averaged measured roughness values prior and after the treatment with enhanced electrolyte polishing for the AlSi10Mg sample

|  | $R_a$ [μm] | $R_z$ [μm] | $R_t$ [μm] |
|---|---|---|---|
| As built sample | 19.7 | 106.0 | 138.6 |
| Sample after enhanced electrolytic polishing | 1.7 | 11.2 | 15.2 |

Figure 2:
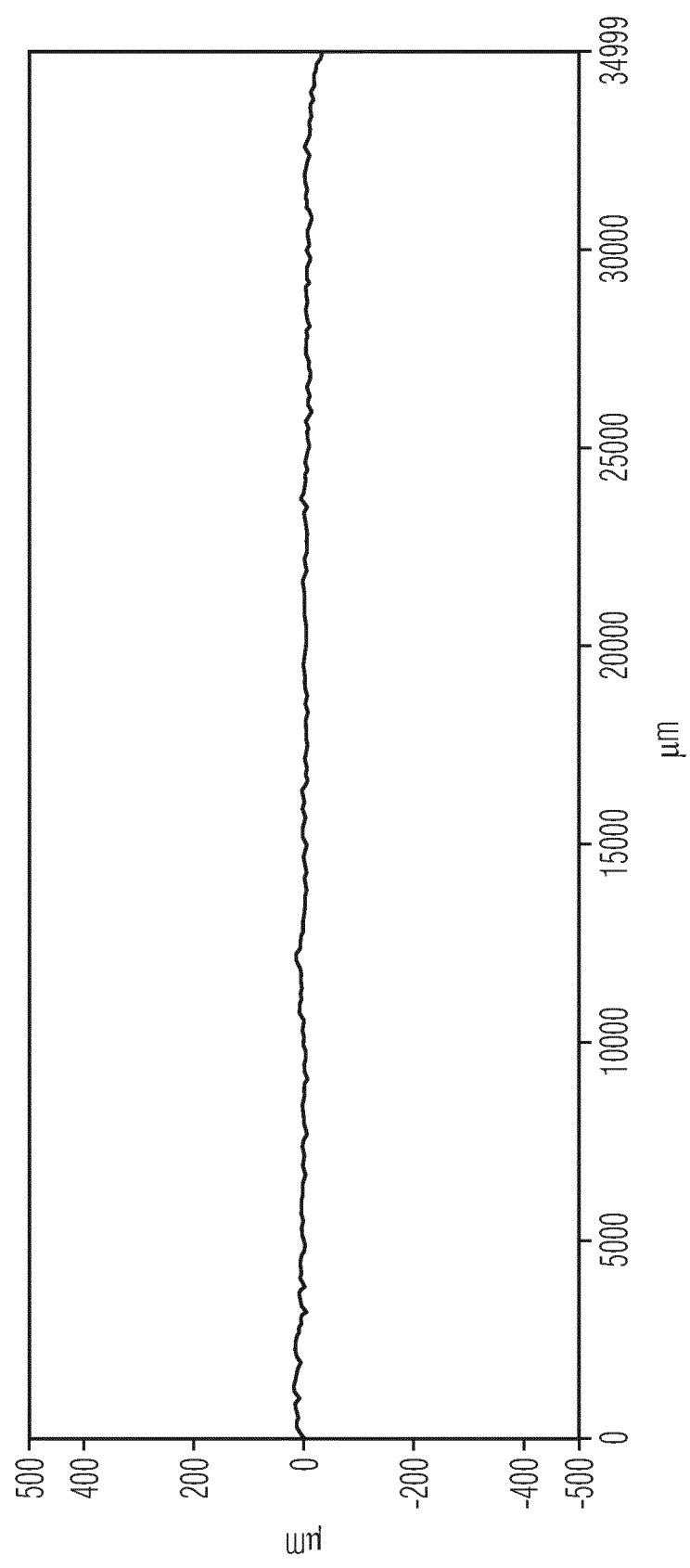
FIG. 2 shows a roughness profile of an AM AlSi10Mg (LBM, PB) sample after the enhanced electrolytic polishing treatment in Example 3.

Table 1 shows that the enhanced electrolytic polishing process has a great impact on the surface roughness with a roughness reduction rate of approximately 91% of the initial roughness. This can be also seen within the roughness profile of each sample, for which examples are given for the as built and polished sample in FIGS. 1 and 2, respectively.

Also in optical micrographs (e.g. at magnifications of 50-fold and 200-fold), this effect can be seen after a surface finishing treatment, and a smoothed shiny surface with no more particles on it is obtained.

Example 4: Treatment of Additively Manufactured AlMgSc

Comparable to the AM AlSi10Mg surfaces (e.g. Example 3), also additively manufactured AlMgSc components feature a high initial surface roughness due to the same reasons as the AlSi10Mg samples: During the manufacturing process, loose powder particles are partially molten onto the components surface contour due to a heat transfer from molten areas into the surrounding powder bed. This again can be seen in micrographs, as above (data not shown).

In order to obtain a smooth surface, the above AlMgSc sample was treated within a treatment time of 4-16 min at a voltage of 150-250 V and a current density between 0.1-5 A/cm$^2$, preferably below 1 A/Cm$^2$, immersed in an electrolyte bath as previously stated for AlMgSc in Examples 1 and 2. The bath temperature was heated up to 70-85° C. Table 2 shows the averaged measured roughness values of the as built as well as the treated sample, with the roughness parameters determined as defined above.

TABLE 2

Comparison of the averaged measured roughness values prior and after the treatment with enhanced electrolyte polishing for the AlMgSc sample

|  | $R_a$ [μm] | $R_z$ [μm] | $R_t$ [μm] |
|---|---|---|---|
| As built sample | 36.2 | 208.9 | 239.8 |
| Sample after enhanced electrolytic polishing | 1.3 | 8.3 | 12.2 |

Figure 3:
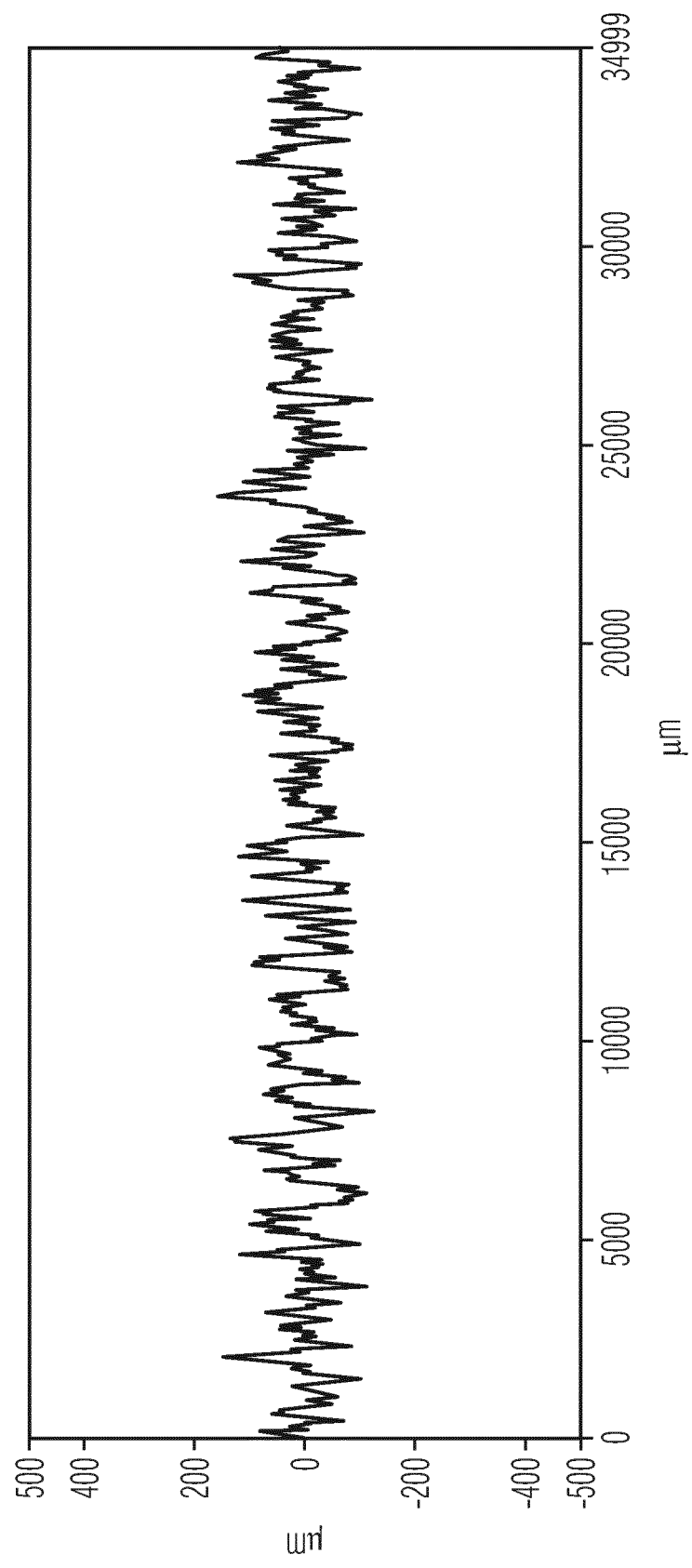
FIG. 3 shows a roughness profile of an as built AM AMgSc (LBM, PB) sample in Example 4.
Figure 4:
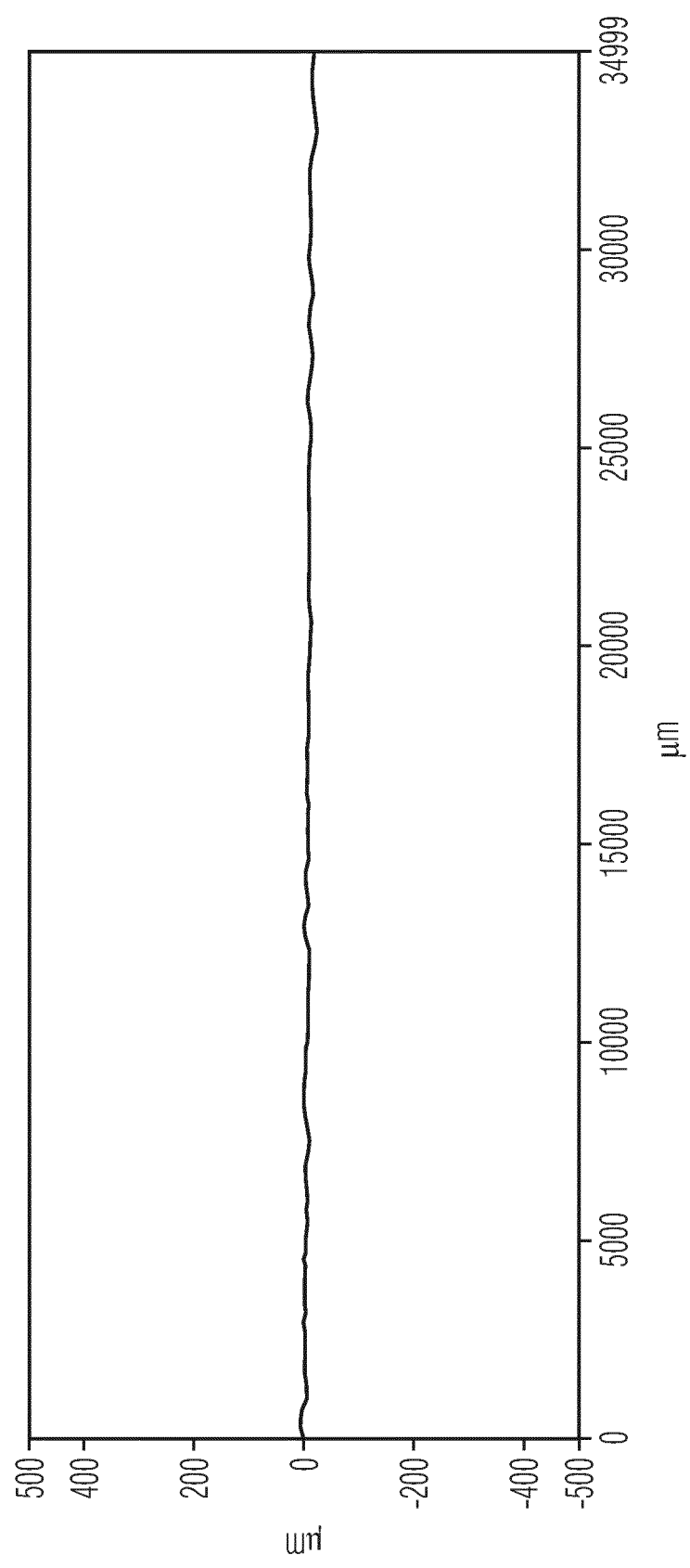
FIG. 4 shows a roughness profile of an AM AMgSc (LBM, PB) sample after the enhanced electrolytic polishing treatment in Example 4.

Table 2 shows that the enhanced electrolytic polishing process has also a great impact on the surface roughness of the AlMgSc sample with a roughness reduction of approximately 96%. Exemplary measured roughness profiles of the as built sample with a high amount of peaks and valleys, as well as of the smoothened sample after treatment can be seen in FIGS. 3 and 4, respectively. The smoothened profile in FIG. 4 again shows the sufficient reduction of all roughness peaks and valleys, resulting in a homogeneously smooth surface. The same results can further be also seen from optical microscopy images, as in Example 3 (data not shown).

Although the present invention has been described with regard to preferred embodiments in the Examples, it is not limited to these embodiments but can be modified in different ways without departing from the core of the invention.

With the present electrolyte a sufficient polishing even of complex structures under conditions that are not as hazardous as in comparable electrolytic polishing processes can be achieved.

The invention claimed is:

1. An electrolyte for the electrolytic polishing of a metallic substrate, consisting of:
   (i) at least one fluoride compound and/or one chloride compound;
   (ii) at least one complexing agent;
   (iii) at least one medium; and
   (iv) additives,
   wherein the electrolyte does not contain an acid compound that is not a complexing agent,
   wherein the at least one fluoride compound is selected from the group consisting of ammonium fluoride, sodium fluoride, potassium fluoride, magnesium fluoride, calcium fluoride, or mixtures thereof, and/or the at least one chloride compound is selected from the group consisting of ammonium chloride, sodium chloride, potassium chloride, magnesium chloride, calcium chloride, or mixtures thereof, and
   wherein the at least one complexing agent is selected from the group consisting of metylglycindiacetic acid (MGDA), ethylenediaminetetraacetate (EDTA), diethylenetriaminepentakismethylenephosphonic acid (DTPMP), aminopolycarboxilic acids (APC), diethylenetriaminepentaacetate (DTPA), nitrilotriacetate (NTA), triphosphate, 1,4,7,10 tetraazacyclododecane-1,4,7,10-tetraacetic acid (DOTA), phosphonate, gluconic acid, β alaninediactetic acid (ADA), N-bis[2-(1,2 dicarboxy-ethoxy)ethyl]glycine (BCA5), N-bis[2-(1,2-dicarboxyethoxy)ethyl]aspatic acid (BCA6), tetracis(2-hydroxypropyl)ethylenediamine (THPED), N-(Hydroxyethyl)-ethylenediaminetriacetic acid (HEDTA) or mixtures thereof.

2. The electrolyte according to claim 1, wherein
   (i) the at least one fluoride compound and/or chloride compound is comprised in an amount of not more than 40 wt.-%,
   and/or
   (iii) the at least one complexing agent is comprised in an amount of not more than 30 wt.-%,
   and/or
   (iii) the at least one medium in an amount of at least 10 wt.-%,
   and/or
   (iv) additives in an amount of not more than 25 wt.-%, based on the weight of the electrolyte (EL).

3. A process for the electrolytic polishing of a metallic substrate comprising the steps of:
   providing an electrolyte according to claim 1 in an electrolytic cell comprising at least one electrode;
   disposing a metallic substrate as an anode in the electrolytic cell;
   applying a current from a power source between the at least one electrode and the metallic substrate; and
   immersing the metallic substrate in the electrolyte.

4. The process according to claim 3, wherein the current is applied at a voltage of at least 10 V.

5. The process according to claim 3, wherein the electrolyte has a temperature in the range of 20 to 95° C.

6. The process according to claim 3, wherein the current is applied at a current density in the range of 0.05 to 10 A/cm$^2$.

7. The process according to claim 3, wherein the current is applied for a time in the range of 1 to 240 min.

* * * * *